United States Patent
Huang et al.

(10) Patent No.: US 7,869,199 B2
(45) Date of Patent: Jan. 11, 2011

(54) BATTERY COVER ASSEMBLY FOR PORTABLE ELECTRONIC DEVICE

(75) Inventors: Lucas Huang, Shenzhen (CN); Lee-Han Ng, Shenzhen (CN); Chien-Chun Huang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/509,049

(22) Filed: Jul. 24, 2009

(65) Prior Publication Data

US 2010/0134961 A1    Jun. 3, 2010

(30) Foreign Application Priority Data

Dec. 1, 2008    (CN) .......................... 2008 1 0205882

(51) Int. Cl.
*H05K 5/00* (2006.01)
*H05K 7/00* (2006.01)
*H04M 1/00* (2006.01)
*H04M 9/00* (2006.01)
*H01M 2/10* (2006.01)

(52) U.S. Cl. ................. 361/679.01; 429/96; 429/97; 429/100; 379/433.11

(58) Field of Classification Search ............ 361/679.01; 379/433.11; 429/10, 96, 97, 100; 455/550.1, 455/572, 575.1, 90.3
See application file for complete search history.

(56) References Cited

U.S. PATENT DOCUMENTS

| 2005/0048999 | A1* | 3/2005 | Tsai ..................... 455/550.1 |
| 2007/0087263 | A1* | 4/2007 | Ge et al. ................ 429/97 |
| 2007/0277349 | A1* | 12/2007 | Yu ....................... 16/320 |
| 2010/0124698 | A1* | 5/2010 | Wu et al. ................ 429/100 |

\* cited by examiner

*Primary Examiner*—Jayprakash N Gandhi
*Assistant Examiner*—Anthony M Haughton
(74) *Attorney, Agent, or Firm*—Steven M. Reiss

(57) ABSTRACT

A battery cover assembly comprises a housing, a battery cover, a first magnetic element and second magnetic element. The magnetic pole of the first magnetic is opposite to the magnetic pole of the second magnetic element such that the first magnetic element and the second magnetic element are magnetically attracted to each other to attach the battery cover to the housing to cover the receiving space of the housing.

16 Claims, 3 Drawing Sheets

BATTERY COVER ASSEMBLY FOR PORTABLE ELECTRONIC DEVICE

BACKGROUND

1. Technical Field

The exemplary disclosure generally relates to battery cover assemblies, and particularly to battery cover assemblies used in portable electronic devices.

2. Description of Related Art

Batteries are widely used in portable electronic devices, such as personal digital assistants (PDAs), cellular phones and, etc. A latch structure is typically used with a battery cover to secure the battery within the electronic device. However, the battery cover can be damaged during disassembly. Moreover, a slight gap is usually formed between the battery cover and the housing of the electronic device. If the electronic device becomes wet, water and/or vapor could penetrate through the gap into the portable electronic device and damaging the circuit board.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary battery cover assembly and portable electronic device using battery cover assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
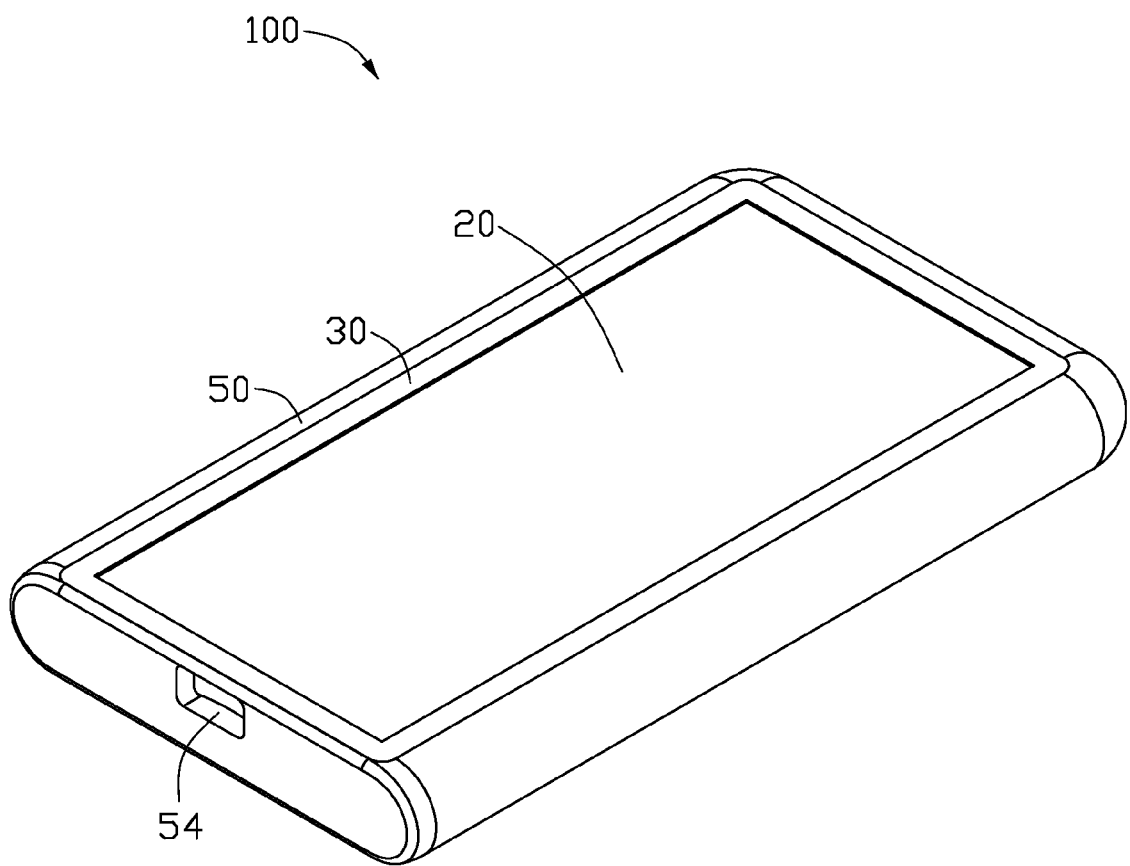
FIG. 1 is an assembled view of an exemplary embodiment of a battery assembly used for holding a battery therein.
Figure 2:
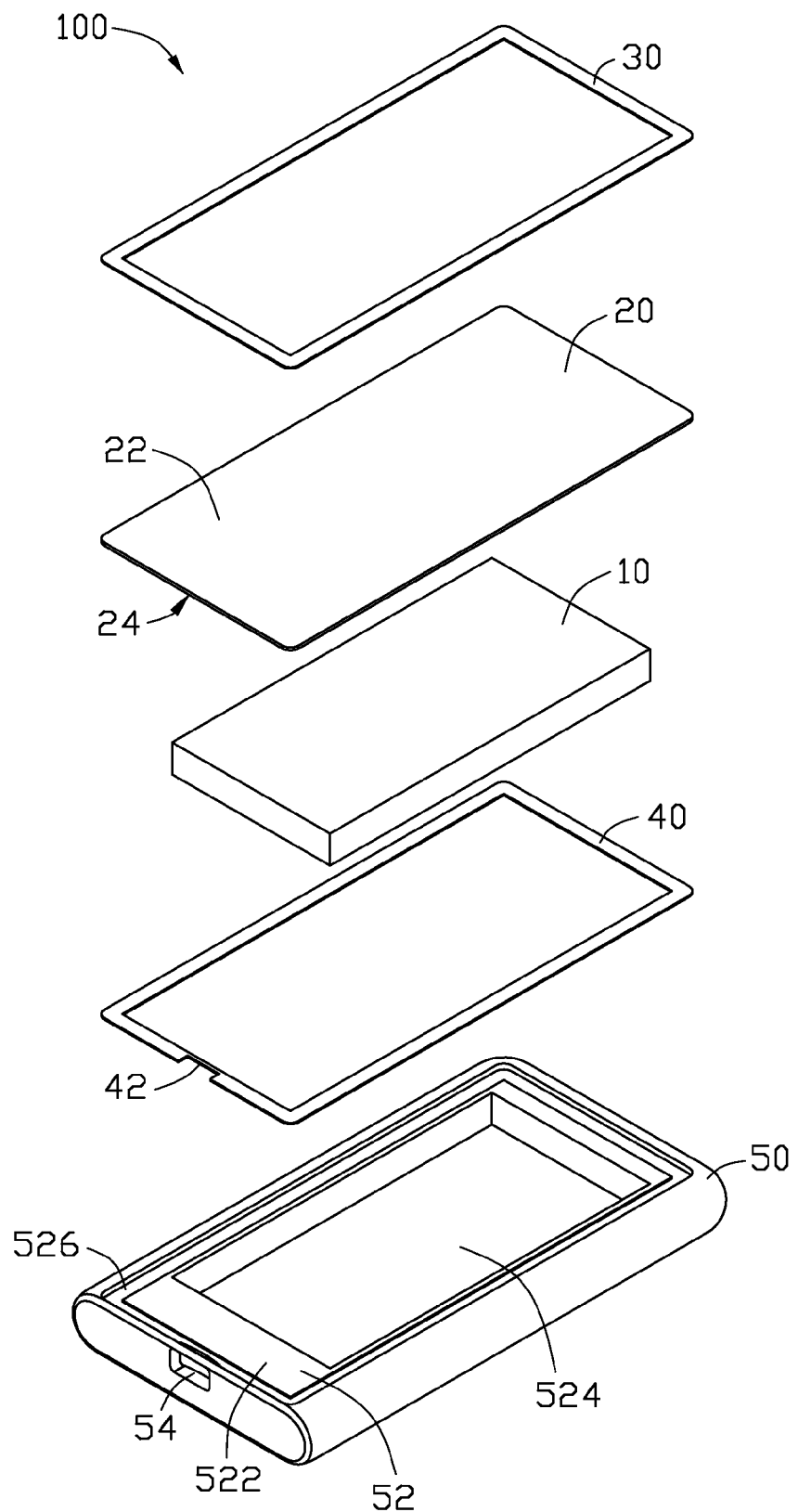
FIG. 2 is an exploded view of the battery cover assembled shown in FIG. 1.

Referring to FIGS. 1 and 2, an exemplary embodiment of a battery cover assembly 100 used in a portable electronic device (e.g.,mobile phone) for accommodating a battery 10 therein is shown. The battery cover assembly 100 includes a battery cover 20, a first magnetic element 30, a second magnetic element 40, and a housing 50 releasably latching with the battery cover 20 by the engagement of the first magnetic element 30 and the second magnetic element 40.

The battery cover 20 includes a first surface 22 facing away from the housing 50 and a second surface 24 opposite to the first surface 22. The battery cover 20 is made of a thermoplastic material chosen from the group consisting of polyethylene (PE), polycarbonate (PC)), acrylonitrile bivinyl styrene (ABS), polymethyl methacrylate (PMMA), and any combination thereof.

The first magnetic element 30 is a plate. The first magnetic element can either be a hollow plate or a solid plate. The external contour of the first magnetic element 30 has the same size and shape as the battery cover 20. The first magnetic element 30 may be attached (e.g., hot-melted or integrally molded) to the first surface 22 of the battery cover 20 and is strong enough to have its magnetic field not be blocked by batter cover 20. It is envisioned that the first magnetic element 30 may also be attached (e.g., hot-melted or integrally molded) to the second surface 24 of the battery cover 20.

The second magnetic element 40 is a hollow plate and has the same size and shape as the first magnetic element 30 when the first magnetic element 30 is a hollow plate. The second magnetic element 40 has a notch 42 defined therethrough configured for facilitating detaching the battery cover 20 from the housing 50, as described hereinafter. The magnetic pole of the second magnetic element 40 is opposite to the magnetic pole of the first magnetic element 30, so the first magnetic element 30 and the second magnetic element 40 are magnetically attracted each other. The second magnetic element 40 is attached (e.g., hot-melted or integrally molded) to the housing 50.

The housing 50 has a compartment 52 defined therein for accommodating the battery cover 20, and a bottom wall 522 is defined in the compartment 52. The housing 50 has a receiving space 524 defined in a center of the bottom wall 522 for accommodating the battery 10 and a groove 526 defined in the bottom wall 522 adjacent to the receiving space 524. In this embodiment, the groove 526 is surrounding the receiving space 524. The groove 526 has the same size and shape as the second magnetic element 40. The second magnetic element 40 is securely accommodated in the groove 526.

The housing 50 has a hole 54 defined one end thereof communicating with the groove 526. When the second magnetic element 40 is accommodated in the groove 526, the notch 42 of the second magnetic element 40 is aligned with the hole 54 of the housing 50.

Figure 3:
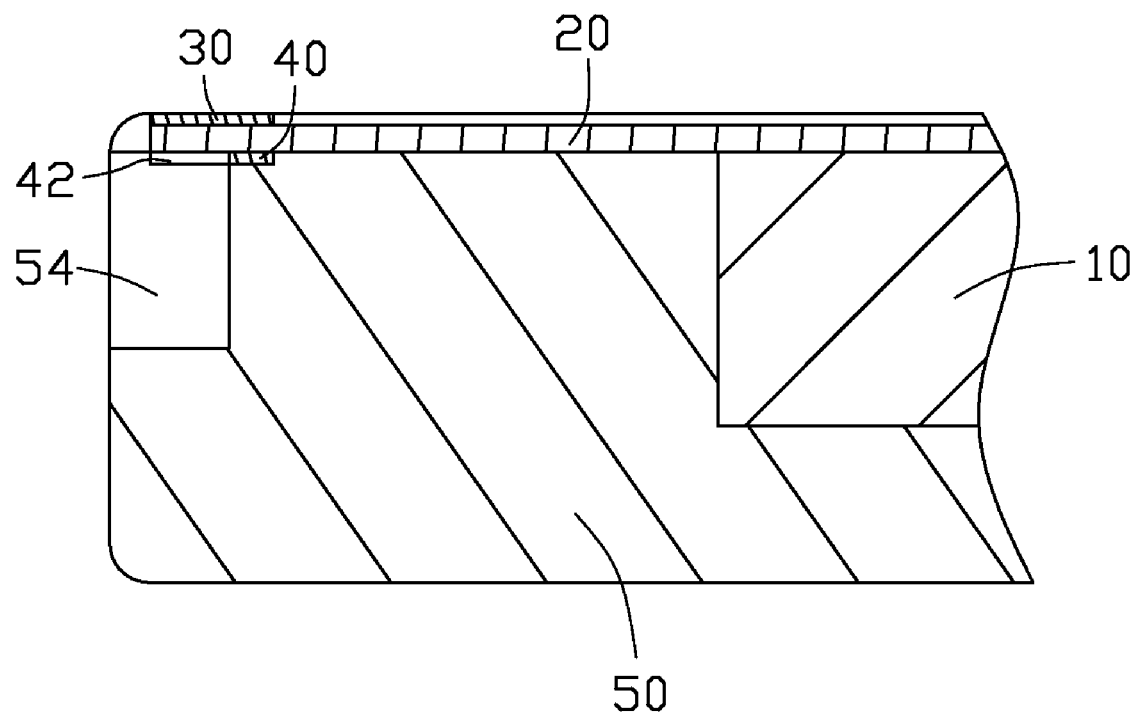
FIG. 3 is a partially enlarged view of the battery cover shown in FIG. 2.

Referring to FIG. 3, in assembling the battery cover assembly 100, first, the first magnetic element 30 is attached/fixed to the first surface 22 or the second surface 24 of the battery cover 20. At this stage, the external contour of the first magnetic element 30 is level with and surrounds the peripheral edge of the battery cover 20. Then, the second magnetic element 40 is fixed (e.g., holt-melted) in the groove 526 of the housing 50. At this time, the hole 54 of the housing 50 is aligned with the notch 42 of the second magnetic element 40. After that, the battery cover 20 is accommodated in the compartment 52 of the housing 50. At this time, the second magnetic element 40 is aligned with the first magnetic element 30. Thereby, the battery cover 20 is securely accommodated in the compartment 52 of the housing 50 by the magnetic attraction between the first magnetic element 30 and the second magnetic element 40. Additionally, the first magnetic element 30 and the second magnetic element 40 are both surrounding the peripheral wall of the batter cover 20, thereby the battery cover 20 is securely attached with the second magnetic element 40 to seal the receiving space 524 of the housing 50. With a result, the battery cover assembly 100 can prevent the external water from entering into the receiving space 524.

In use, external force is applied to battery cover 20 via the hole 54 of the housing 50 and the notch 42 of the second magnetic element 40. Then, the battery cover 20 is pushed by the external force to overcome the magnetic attraction between the first magnetic element 30 and the second magnetic element 40, so as to detach the battery cover 20 from the housing 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly comprising:
   a housing, the housing defining a receiving space for accommodating a battery;
   a battery cover;
   a first magnetic element, the first magnetic element mounted to a surface of the battery cover and disposed at peripheral edge of the surface of the battery cover; and
   a second magnetic element, the second magnetic element disposed on the housing adjacent to the receiving space and for aligning with the first magnetic element;
   wherein the magnetic pole of the first magnetic is opposite to the magnetic pole of the second magnetic element such that the first magnetic element and the second magnetic element are magnetically attracted to each other to attach the battery cover to the housing to cover the receiving space of the housing.

2. The battery cover assembly of claim 1, wherein the first magnetic element is a hollow plate, the external contour of the first magnetic element is surrounding the peripheral edge of said surface of the battery cover.

3. The battery cover assembly of claim 2, wherein the second magnetic element has the same size and shape as the first magnetic element.

4. The battery cover assembly of claim 3, wherein the second magnetic element has a notch defined therein, the housing has a hole defined in an end thereof aligned with the notch, and the hole communicates with the notch.

5. The battery cover assembly of claim 4, wherein the housing has a groove defined therein surrounding the receiving space, the second magnetic element is securely accommodated in the groove surrounding the receiving space.

6. The battery cover assembly of claim 5, wherein the second magnetic element is hot melted in the groove.

7. The battery cover assembly of claim 1, wherein the surface of the battery cover to which the first magnet is attached faces away from the housing.

8. The battery cover assembly of claim 1, wherein the said surface of the battery cover to which the first magnet is attached faces the housing.

9. A portable electronic device comprising:
   a housing, the housing defining a receiving space for accommodating a battery;
   a battery cover;
   a first magnetic element, the first magnetic element mounted to a surface of the battery cover and disposed at a peripheral edge of the surface of the battery cover; and
   a second magnetic element, the second magnetic element disposed on the housing adjacent to the receiving space and for aligning with the first magnetic element;
   wherein the magnetic pole of the first magnetic is opposite to the magnetic pole of the second magnetic element such that the first magnetic element and the second magnetic element are magnetically attracted to each other to attach the battery cover to the housing to cover the receiving space of the housing.

10. The portable electronic device of claim 9, wherein the first magnetic element is a hollow plate, the external contour of the first magnetic element is surrounding the peripheral edge of said surface of the battery cover.

11. The portable electronic device of claim 10, wherein the second magnetic element has the same size and shape as the first magnetic element.

12. The portable electronic device of claim 11, wherein the second magnetic element has a notch defined therein, the housing has a hole defined one end thereof aligned with the notch, and the hole communicates with the notch.

13. The portable electronic device of claim 12, wherein the housing has a groove defined therein surrounding the receiving space, the second magnetic element is securely accommodated in the groove surrounding the receiving space.

14. The portable electronic device of claim 13, wherein the second magnetic element is holt melted in the groove.

15. The battery cover assembly of claim 9, wherein the surface of the battery cover to which the first magnet is attached faces away from the housing.

16. The battery cover assembly of claim 9, wherein the said surface of the battery cover to which the first magnet is attached faces the housing.

* * * * *